Patented Aug. 17, 1954

2,686,740

UNITED STATES PATENT OFFICE

2,686,740

INSULATED ELECTRICAL CONDUCTOR AND METHOD OF PRODUCING SAME

John T. Goodwin, Midland, Mich., assignor to Dow Corning Corporation, Midland, Mich., a corporation of Michigan No Drawing. Application May 31, 1951, Serial No. 229,259

2 Claims. (Cl. 117—128.4)

The present invention relates to new and improved alkyd resins and, in particular, to alkyd resins of thermal stability far greater than any heretofore known alkyd resins.

Alkyd resins in general are prepared by the interaction of a polybasic acid and a polyhydric alcohol. The polyhydric alcohol employed is, in general, glycerine which, having three hydroxyl radicals, makes possible the cross linking of the polymer to form a resin. The polybasic acid employed in the preparation of alkyds is phthalic anhydride. While other polybasic acids have been mentioned as being equivalent to phthalic anhydride or orthophthalic acid, the methods which have been described for the preparation of alkyd resins are unsuitable for the preparation of resins from certain polybasic acids. In particular, these methods are unsuitable for the preparation of alkyd type resins from terephthalic acid and isophthalic acid.

Resins in accordance with the present invention are polyesters of a polybasic acid of the group consisting of terephthalic acid and isophthalic acid and of a polyhydric alcohol of the group consisting of glycerine and pentaerythritol.

In accordance with a specific preferred embodiment of the resins of the present invention, a resin as above stated contains organic silane modification.

Further, the present invention relates to a specific preferred method for the preparation of resins as above stated by the use of diesters of the dibasic acids and the interaction of these esters with the polyhydric alcohols by ester interchange. For the preparation of the silicone-modified resins, the product of the ester interchange may be reacted with a suitable organic silane.

The resins hereof contain polymer units derived from the polyhydric alcohol and polymer units derived from the dibasic acid in such relative proportion as to reflect a ratio of between 0.9 and 4 hydroxyl radicals per carboxy radical. Thus, the ratio of the sum of the hydroxyls plus the ester linkages in the resin to the sum of the carboxy radicals plus the ester linkages is between 0.9 to 1 and 4 to 1.

From the ratios stated, it is obvious that there may be a slight excess of acid radicals over the alcohol hydroxyl radicals in the resin. Alternatively, the alcohol may be employed in quantity such that there are four alcoholic hydroxyl radicals per carboxy radical, in which case there are three hydroxyl radicals for every ester linkage.

Considerable difficulty is encountered in the preparation of resins which conform to the present invention, particularly due to the insolubility and high melting point of terephthalic acid. Furthermore, when pentaerythritol is employed, for the process, difficulties are encountered in particular with respect to solubility thereof. One suitable method for the preparation of resins in accordance herewith is by heating a mechanical mixture of the polybasic acid and the polyhydric alcohol. Particularly with glycerine, it is possible to obtain some esterification of the slurry. Care must be employed during heating to avoid local overheating of the reaction mixture.

The preferred method in accordance with the present invention involves the employment of a diester of the tere- and isophthalic acid. The ester employed is a dialkyl terephthalate or isophthalate such, for example, as a diester formed from an alcohol from methanol to octanol, inclusive. Higher boiling alcohols may be used for the preparation of the ester. However, these are less desired, particularly due to the lower volatility of the alcohol produced in the ester interchange. In accordance with this method, the dialkyl ester of the tere- or isophthalic acid is heated with glycerine or pentaerythritol. During the heating the equivalent alcohol is liberated and is removed. This method is quite advantageous in comparison with the direct heating of the dibasic acid and the polyhydric alcohol, due to the much lower melting point of the dialkoxy esters of the acids in question.

Other methods for the preparation of the resins hereof may be employed if desired.

In those resins which are silane modified, the resins contain condensed therein units of the average general formula

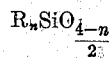

in which R represents a radical of the group alkyl, aryl, aryloxy and mixtures thereof, and $n$ has a value from 0 to 3, inclusive. Thus, this silane modification may be effected by cooking the polyester with a silane or mixture of silanes of the types methyltriethoxysilane, phenyltriethoxy - silane, phenylmethyldiethoxysilane, diphenyldiethoxysilane, dimethyldiethoxysilane, trimethylchlorosilane or the equivalent halogenosilanes, tetracresyl silicate, tetraphenyl silicate and the like. It is to be noted in connection with the silicates that a portion of the aryloxy radicals are removed during such cooking, with the formation of the equivalent tar acid.

Silane modification is applicable to those polyesters of the type described in which there is an excess of hydroxyl radicals bonded to the polyhydric alcohol residues or units. The modifying silane is bonded thereto through an SiOC linkage. The silane may be used in amount up to an amount equivalent to the residual hydroxyls. Thus, the siloxy may be present in amount up to sufficient that all alcoholic hydroxyls are esterified either with carboxy substituents or with siloxy substituents.

Thus, if one mole of glycerine is employed, this provides three hydroxyl radicals. If one mole of terephthalic acid is employed, this provides two carboxy radicals. If phenylmethyldiethoxysilane is employed for silane modification, it may be employed up to one-half mole, whereby to provide two bonds from silicon available for condensation with hydroxyls. Thus, there are three polyhydric alcohol hydroxyls, which limits the amount of the silane employed to the amount stated, due to two of the hydroxyls being esterified with the terephthalic acid.

When the preferred method for preparing the resins as above described is employed and it is desired to modify the resin with siloxy substituents, a silane is reacted by heating it with the glyceryl ester. The silane employed is of the general formula $R_nSiX_{4-n}$, in which R represents alkyl, aryl or aryloxy or mixtures thereof, X represents alkoxy, aryloxy or halogen, and $n$ has a value from 0 to 3, inclusive. The silane may be employed in amount up to that amount equivalent to the number of free alcoholic hydroxyls remaining in the glyceryl ester.

Resins in accordance with the present invention are of exceedingly unusual properties for alkyd resins. When cured, they are hard, tough and flexible. Accordingly, they are of utility as magnet wire enamel and for panel coating on automobiles and the like. Further, due to their exceptional heat stability far and above heretofore known alkyd resins, they are useful for panel coating of articles operating at exceptionally high temperatures, as for example, furnaces, stoves and smokestacks. To obtain the maximum benefit of this invention, it is necessary that they be cured at a temperature of at least 200° C., thereby eliminating brittleness. The time varies with the temperature and thickness of the resin. Thus, at 200° C. it may take one hour or more, while at 450° C. one minute of annealing is usually sufficient. At 500 to 600° C. very short times are used.

*Example 1*

Glycerine in amount of 92 grams was mixed with 83.05 grams of terephthalic acid, and the mixture was heated. Droplets of water started to form in the flask at 160° C. Heating was continued for five hours at a temperature up to 212° C., during which time 14 cc. of water was removed by distillation. The mixture was then cooled to 140° C., and 210 grams of phenylmethyldiethoxysilane were added. The mixture was then heated for about one hour at a temperature of 180° C., at which time the resin wrapped around the stirrer which was employed to agitate the reaction mixture throughout the heating periods. 190 grams of cyclohexanone was added and the solution filtered to remove the product from the unreacted terephthalic acid. 31 per cent of the terephthalic acid was recovered unreacted. The glyceryl terephthalate, which in this instance was employed for silane modification, is itself a desirable coating resin both for wire coating and panel coating. The silane modification effects some change of the properties of the resin.

*Example 2*

A mixture of 41.4 grams of glycerine containing 4.85 per cent water and 50 grams of diethylterephthalate was heated with 0.18 gram of zinc oxide and 0.18 gram of calcium oxide. The mixture was heated for four hours at a temperature of 194° C. with agitation and with carbon dioxide bubbling through the mixture. During this heating 17 grams of ethanol was removed by distillation with the carbon dioxide. The resin so produced was a viscous, cloudy tan fluid which could be set to a solid upon heating as a film. To the resin so prepared 94.5 grams of phenylmethyldiethoxysilane were added. The addition was made at a temperature of 90° C. The mixture was heated for thirty-five minutes at top temperature of 170° C., allowing volatile material to escape. During the ensuing fifteen minutes the temperature was raised to 182° C. By this time the resin was highly viscous. 80 grams of cyclohexanone were added. While the resin was poorly soluble, most of it was dissolved in the cyclohexanone by stirring. The undissolved resin was removed by filtration, to give a clear brown resin solution. The resin was employed to coat a panel and was found to cure in one to two hours at 135° C. to a clear hard film. The weight loss on heating the resin for three hours at 200° C. was found to be 6.9 per cent.

*Example 3*

46 grams of anhydrous glycerine and 105 grams of isophthalic acid and 200 grams of butyl Carbitol acetate were mixed and heated at 240° C. with stirring for two and one-half hours. The solution was then coated on copper wire by passing the wire through the solution and then through a heating tower at the rate of 5 feet per minute at a temperature of 400° C. The resulting wire was tested and found to have a scrape hardness of 18 ounces. After standing twenty-four hours at 100 per cent relative humidity at 35° C., the scrape was unchanged. The same was true after one hour's immersion in toluene at 25° C.

*Example 4*

A mixture of 92 grams of anhydrous glycerine, 83 grams of terephthalic acid and 70 grams of diethyl Carbitol $$(C_2H_5OCH_2CH_2OCH_2CH_2OC_2H_5)$$

was mixed and heated at 185 to 215° C. for nine hours. During this time 20 ml. of water was removed. The reaction mixture was cooled to 40° C., and 100 grams more of diethyl Carbitol was added. The solution was stirred as a mixture of 163 grams of phenylmethyldichlorosilane and 20.5 grams of phenyltrichlorosilane was added. Hydrogen chloride was evolved. After standing over night, the mixture was heated up to 190° C. for ten hours. More HCl came off as the viscosity of this material gradually increased. At the end of the heating period, 200 grams cyclohexanone was added. The resin solution was coated on copper wire as in Example 3, and the resulting film had an initial scrape hardness of 14 ounces, which dropped to 12 ounces after twenty-four hours at 35° C. in 100 per cent relative humidity.

*Example 5*

72.4 grams of pentaerythritol, 83 grams of terephthalic acid and 100 grams of dimethylformamide were mixed and heated from 180° to 215°

C. for twenty-one hours. The mixture was cooled to 90° C. and 148 grams of a partially hydrolyzed phenylmethylsiloxane containing 39.7 per cent by weight silicon-bonded isopropoxy groups was added. The temperature was then raised to 150° C. over a period of four hours, during which time 46 grams of isopropanol was removed. The resin was then cooled, and 400 grams of dimethylformamide was added. The resulting solution was filtered and was coated on copper wire, which was then passed through a tower at the rate of 5 feet per minute and heated at a temperature of 420° C. The resulting film had an initial scrape of 18 ounces, and after twenty-four hours at 35° C. at 100 per cent relative humidity, the scrape was 18 ounces.

*Example 6*

92 grams of anhydrous glycerine, 211 grams of terephthalic acid and 200 grams of butyl Carbitol acetate were heated at 240° C. for four and one-half hours. The solution was cooled to 180° C., and 55.5 grams of tetracresoxysilane was added. The mixture was heated to 245° C. for four hours. During this time 12 ml. of cresol was removed. The resulting resin was coated on copper wire by the method of Example 3, and the resulting coat had an initial scrape of 20 ounces. This value was maintained after twenty-four hours at 100 per cent relative humidity and after one hour in toluene.

*Example 7*

92 grams of anhydrous glycerine and 83 grams of terephthalic acid were mixed with 200 grams of butyl Carbitol acetate and heated at a temperature of 238° to 249° C. for one hour. The material was placed on an aluminum dish and heated at 250° C. for one and one-half hours to give a flexible tough film. The material coated satisfactorily on bare copper wire in accordance with the procedure in Example 3.

That which is claimed is:

1. A method of preparing an electrical conductor for use in electrical equipment which comprises coating the conductor with a solution of a modified polyester resin of an alcohol selected from the group consisting of glycerine and pentaerythritol, an acid selected from the group consisting of terephthalic and isophthalic acids and dialkyl esters of said acids, and a silane of the formula $R_nSiX_{4-n}$ in which R is of the group consisting of alkyl, aryl, and aryloxy radicals, X is of the group consisting of alkoxy, aryloxy, and halogen, and $n$ has a value of from 0 to 3, in said modified polyester resin the acid and silane being present in amount equivalent to the alcohol, and thereafter heating the conductor at a temperature of at least 200° C.

2. An article of manufacture comprising an electrical conductor having thereon a resinous coating which was cured at a temperature of at least 200° C., said coating having a scrape hardness upwards of 18 ounces and maintaining its hardness essentially unchanged after being subjected for 24 hours to an atmosphere of 100 per cent relative humidity at 25° C. and after being immersed in toluene for one hour at 25° C., said coating having exceptional heat stability and being composed essentially of the reaction product of an alcohol selected from the group consisting of glycerine and pentaerythritol, an acid selected from the group consisting of terephthalic and isophthalic acids and dialkyl esters of said acids and a silane of the formula $R_nSiX_{4-n}$ in which R is selected from the group consisting of alkyl, aryl, and aryloxy radicals, X is of the group consisting of alkoxy, aryloxy, and halogen and $n$ has a value from 0 to 2, in said reaction product the acid and silane being present in amount equivalent to the alcohol.

References Cited in the file of this patent

UNITED STATES PATENTS

| Number | Name | Date |
|---|---|---|
| 2,048,799 | Lawson | July 28, 1936 |
| 2,258,221 | Rochow | Oct. 7, 1941 |
| 2,340,109 | D'Alelio | Jan. 25, 1944 |
| 2,465,319 | Whinfield et al. | Mar. 22, 1949 |

FOREIGN PATENTS

| Number | Country | Date |
|---|---|---|
| 622,671 | Great Britain | May 5, 1949 |
| 650,247 | Great Britain | Feb. 21, 1951 |

OTHER REFERENCES

Hovey et al.: Paint Oil and Chem. Review, January 18, 1940, pages 9, 37, 38, 42.